United States Patent Office 3,644,422
Patented Feb. 22, 1972

3,644,422
2-(SUBSTITUTED PHENOXYMETHYL) DIOXOLANES
Akihiko Mine, Minoo-shi, Takeo Satomi, Takarazuka-shi, Naganori Hino and Katsuzo Kamoshita, Toyonaka-shi, and Yoshitsugu Suzuki and Shinji Nakai, Takarazuka-shi, Japan, assignors to Sumitomo Chemical Company, Ltd., Osaka, Japan
No Drawing. Filed Mar. 26, 1970, Ser. No. 22,996
Claims priority, application Japan, Apr. 7, 1969, 44/27,050
Int. Cl. C07d 13/04
U.S. Cl. 260—340.9                                   4 Claims

ABSTRACT OF THE DISCLOSURE

Phenoxyacetaldehyde ethyleneacetal derivatives represented by the formula,

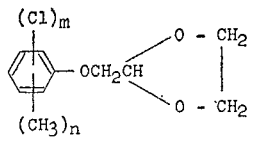

wherein $m$ and $n$ are 0 or an integer of 1 to 5, and the sum of $m$ and $n$ is 1 to 5, which may be useful as herbicidal compositions with high herbicidal activities on both broadleaved and grass weeds and lower toxicities on fishes.

---

The present invention relates to novel phenoxyacetaldehyde ethyleneacetal derivatives having the formula,

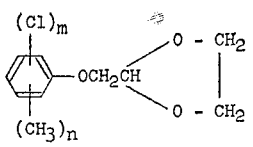

wherein $m$ and $n$ are 0 or an integer of 1 to 5 and the sum of $m$ and $n$ is 1 to 5, and herbicidal compositions containing the same.

Pentachlorophenol (hereinafter referred to as PCP) has been hitherto used as a herbicide for controlling weeds in a paddy field with drawbacks such as, for example, large decrease of its herbicidal effect when it is not applied within 5 days after rice-planting and high toxicity on fishes and the like.

As a result of recent lack of labour, it takes many time for transplanting of seedlings and therefore the application of herbicides is inclined to be delayed further to make the herbicidal effect of PCP decreased. Therefore, at present it is desired that a herbicide could show a high herbicidal activity even after it was applied within 20 days after planting of seedlings.

Furthermore, care must be taken in applying a herbicide such as PCP having a high toxicity on fishes because paddy rice is cultivated under a submerged condition.

On the other hand, hormon type herbicides such as 2,4-D(2,4 - dichlorophenoxy acetic acid) or MCPA (2-methyl-4-chlorophenoxy acetic acid) can control broadleaved weeds by applying them to the weeds in the growing stage. However, since these herbicides inhibit strongly offshooting of rice plants, there is a danger of causing phytotoxicity which often results in a decrease of yield when such herbicides are applied before the maximum offshooting period. Additionally, such herbicides are far less effective to other main weeds such as barnyard grass in paddy fields as compared with those to broadleaved weeds. Thus, it can be said that there has not been any herbicides which can be applied within 10-20 days after planting for the control of weeds in paddy fields.

It is an object of the present invention to provide a novel compound having a capability of controlling weeds such as monochoria (*Monochoria vaginalis* Presl.), false pimpernel (*Lindernia pyxidaria* L.), toothcup (*Rotala indica* Koehne), elatine sp. (*Elatine orientaris*), Cyperus sp. (Cyperus difformis), slender spikerush (*Eleocharis acicularis*Q, barnyard grass (*Panicum crus-galli*) and the like in a paddy field, and having no phytotoxicity on rice plants and lower toxicities on mammals and fishes.

It is another object of the present invention to provide a novel compound having a capability of controlling weeds such as common pruslane (*Portulaca oleracea*), Polygonum sp. (*Polygonum longisetum*), white-birds eye (*Stellaria neglect*), milk pruslane (*Euphorbia supina*), chufa (*Cyperus microiria*), crab grass (*Digitaria adscendens*), foxtail (*Alopeciris aequalis*) and the like in upland rice fields, various vegetable fields, orchards, turfs, non-crop lands, forests and the like.

It is a futher object of the present invention to provide a novel compound having a capabilty of controlling weeds in both soil application in the pre-emergence and application to growing weeds in the post-emergence.

These and other objects of the present invention can be accomplished by providing a novel phenoxyacetaldehyde ethyleneacetal derivative represented by the Formula I.

The present compound of the Formula I may be prepared by reacting an alkali metal salt of a substituted phenol represented by the Formula II,

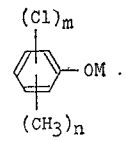

wherein $m$ and $n$ are the same as defined above and M is an alkali metal, with a halogenated ethyleneacetal represented by the Formula III,

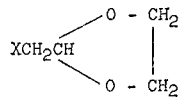

wherein X is a halogen; or reacting a substituted phenoxyacetaldehyde represented by the Formula IV,

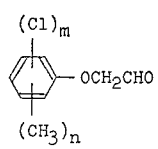

wherein $m$ and $n$ are the same as defined above, with ethylene glycol.

The present process will be more concretely explained as follows.

First method

An alkaline metal salt of a substituted phenol is reacted with a halogenated ethyleneacetal to obtain the present compound, and the reaction is shown as follows:

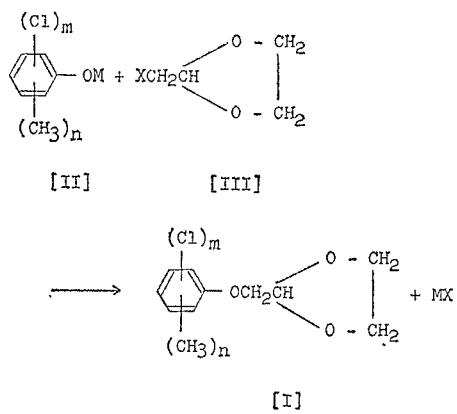

wherein M, X, m and n are the same as defined above.

The reaction may be accomplished advantageously in an inert organic solvent, preferably in an alcohol. For example, sodium salt of the substituted phenol and equimolar amount of chloroethyleneacetal are added to an alcohol and the mixture is subjected to reflux or heating for 4–5 hours under ordinary or higher pressure at a temperature of 130–180° C. After cooling to room temperature, water is added, and then a resulting product is extracted with an organic solvent such as ether. The objective substituted phenoxyacetaldehyde ethyleneacetal [I] is obtained by distilling said organic solvent off from the thus obtained organic layer.

Second method

A substituted phenoxyacetaldehyde [IV] is reacted with ethylene glycol to obtain the present compound, and the reaction is shown as follows:

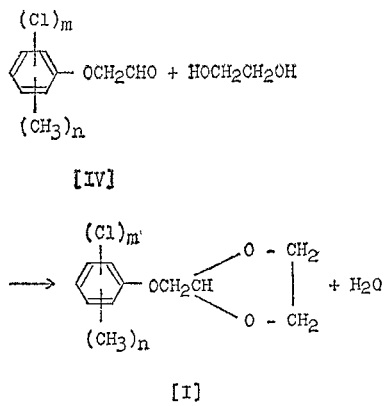

wherein m and n are the same as defined above.

The reaction proceeds exothermically when a substitued phenoxyacetaldehyde is dissolved into anhydrous ethylene glycol solution saturated with such acids as hydrochloric acid. The resulting mixture is allowed to stand at relatively low temperature, preferably at 0° to 5° C. for several hours, and then an alkali such as sodium or potassium carbonate in the form of an aqueous solution is added thereto in order to neutralize the acid. The separated oily acetal derivative is extracted with an organic solvent such as ether, and the objective substituted phenoxyacetaldehyde ethyleneacetal is obtained by distilling said organic solvent off from the organic layer.

Illustrative examples of the present compound having the Formula I, include the following compounds. However, the present invention is not limited to these compounds:

(1) Cl—⟨C₆H₃⟩—OCH₂CH(O—CH₂)(O—CH₂)  B.P. 102°–104°C./0.018 mm.Hg  $n_D^{21.5}$ 1.5534
(with Cl substituent)

(2) Cl—⟨C₆H₃⟩—OCH₂CH(O—CH₂)(O—CH₂)  B.P. 97°–100°C./0.14 mm.Hg  $n_D^{19.5}$ 1.5387
(with CH₃ substituent)

(3) Cl₂—⟨C₆H₂⟩(Cl)—OCH₂CH(O—CH₂)(O—CH₂)  B.P. 129°–130°C./0.25 mm.Hg  M.P. 43°–45°C.

All the thus obtained present compounds are novel and have very strong herbicidal actions, and the characteristics of the present compounds are summarized as follows:

(a) High herbicidal effects on various broadleafed and grass weeds.
(b) Constant herbicidal effects when applied to soil in a pre-emergence application and to the foliage of weeds in a post-emergence application.
(c) Long residual effects in the soils.
(d) Lower toxicities on both mammals and fishes.
(e) No phytotoxicity on transplanted young seedlings.
(f) A hormon action at a lower concentration.

The present invention will be understood by referring the following examples, which are, of course, not intended to limit the scope of the present invention.

EXAMPLE 1

Preparation of 2,4-dichlorophenoxyacetaldehyde ethyleneacetal

Sodium 2,4-dichlorophenolate (16.2 g.) and chloroacetaldehyde ethyleneacetal (12.2 g.) are added into 200 ml. of diethyleneglycohol. The mixture is stirred and heated to about 180° C., and maintained at the same level of the temperature for 5 hours. Then the mixture is cooled at room temperature. After the addition of 200 ml. of water to the mixture, the separated oil layer is extracted with 100 ml. of ether. The ether layer is washed with water, twice and dried over anhydrous sodium sulfate. The ether is evaporated and then the residual oil layer is distilled under reduced pressure to yield 25.3 g. of 2,4-dichlorophenoxyacetaldehyde ethylene, B.P. 102°–104° C./0.018 mm. Hg, $n_D^{21.5}$ 1,5534.

EXAMPLE 2

Preparation of 2-methyl 4-chlorophenoxyacetaldehyde ethyleneacetal

A 100 ml. of absolute ethyleneglycohol is saturated with dry hydrogenchloride at 0° C. And then the 2-methyl 4-chlorophenoxyacetaldehyde 18.4 g. is added, with stirring to the ethyleneglycohol-hydrogenchloride solution at about 0° C. Then the solution is treated gradually with powdered sodium bicarbonate until all acid is neutralized. The mixture is filtered. The filtrate is added to a 200 ml. of ice water and the separated oil layer is extracted with 200 ml. of ether. The ether solution is dried over potassium bicarbonate. It is then filtered and the ether is evaporated. The residual oil layer is distilled under reduced pressure to yield 18.3 g. of 2-methyl 4-chlorophenoxyacetaldehyde ethyleneacetal, B.P. 97°–100° C./0.14 mm. Hg, $n_D^{19.5}$ 1.5387.

The following experimental examples are given to explain in detail the effectiveness of the present compounds.

Experimental Example 1.—Seeds of radish, goosefoot and false pimpernel as a typical broadleafed plant and barnyard grass as a typical grass plant were sowed in flower pots and covered with soil. Thereafter, the predetermined doses shown in Table 1 below were applied to soil surface. The applied flower pots were placed in a glass house to grow up. 20 days after the application, the herbicidal effects of the present compounds were observed. The results are shown in Table 1. The herbicidal effects of each compound are shown by numbers 0 (no effect) to 5 (complete death). The application was carried out with the compounds all in the form of emulsifiable concentrate which was to be diluted with water.

TABLE 1

Herbicidal effects in the pre-emergence application

| Compound | Dose (g./10a) | Herbicidal effect | | | |
|---|---|---|---|---|---|
| | | Radish | Barnyard grass | Goose-foot | False pimpernel |
| (1) | 100 | 5 | 4 | 5 | 5 |
| | 50 | 4 | 3 | 4 | 4 |
| | 25 | 2 | 2 | 3 | 3 |
| (2) | 100 | 5 | 5 | 5 | 5 |
| | 50 | 5 | 4 | 5 | 5 |
| | 25 | 4 | 3 | 4 | 4 |
| (3) | 100 | 5 | 4 | 5 | 5 |
| | 50 | 5 | 4 | 5 | 4 |
| | 25 | 4 | 3 | 3 | 3 |
| 2,4-D* | 100 | 5 | 5 | 5 | 5 |
| | 50 | 5 | 4 | 5 | 5 |
| | 25 | 3 | 3 | 4 | 4 |

*Reference compound.

Experimental Example 2.—1.5 kg. of paddy soil were taken into each Wagner's pot having a diameter of 14 cm. and these pots were kept under submerged condition. Seeds of slender spikerush were sowed and young seedlings were planted, and then seeds of barnyard grass were sowed. After covering both the seeds with soil, the pots were kept in a glass house to grow up the seeds. 12 days after sowing, the predetermined doses of the herbicides shown in Table 2 were applied to the surface of soil which were kept under submerged condition. In this case, there had been observed the emergence of broadleafed weeds such as monochoria, false pimpernel, toothcup and the like. Then, after keeping the pots under submerged condition of 3 cm. in a glass house for 25 days, the herbicidal effects and the degree of phytotoxicity on rice plants were observed. The herbicidal effect of each compound is shown as in Experimental Example 1. The phytotoxicity is shown by signs — (no phytotoxicity), +, +, ++ and +++ (maximum phytotoxicity).

The results are shown in Table 2 below.

TABLE 2

Herbicidal effects in the post-emergence application under submerged condition

| Compound | Dose (g./10a) | Herbicidal effect | | | Phytotoxicity to rice plants |
|---|---|---|---|---|---|
| | | Barnyard grass | Broadleafed weeds | Slender spikerush | |
| (1) | 40 | 4 | 5 | 4 | — |
| | 20 | 3 | 3 | 3 | — |
| (2) | 40 | 5 | 5 | 5 | — |
| | 20 | 4 | 4 | 4 | — |
| (3) | 40 | 4 | 5 | 4 | — |
| | 20 | 3 | 4 | 3 | — |
| 2,4-D* | 40 | 2 | 5 | 5 | — |
| | 20 | 1 | 5 | 4 | ± |

*Reference compound.

As is clear from the above results, the present compounds have excellent properties as a herbicide and they may be applied as they are or in formulations such as granules, dust, wettable powder and emulsifiable concentrate. However, it is desirable to select a suitable formulation dependent on the species and the sizes of the crops, the object of the application and the like. Said formulations are prepared by admixing said compounds with solid or liquid carriers, emulsifiable agents and the like.

Suitable solid carriers are, for example, talc, bentonite, clay, kaolin, diatomaceous earth, vermiculite, slaked lime and the like; and suitable liquid carrier are, for example, benzene, alcohols, xylene, dioxane, methylnaphthalene, cyclohexanone and the like; and suitable emulsifiable agents are, for example, alkyl sulphate, alkyl sulfonate, aryl sulfonate, polyethylene glycol ethers, polyalcohol esters and the like.

The present compounds may be applied in combination with spreaders and stickers for agricultural use in order to increase the effects. They may be also applied in combination with fungicides, insecticides, nematocides, the other herbicides or fertilizers.

The following examples are illustrative of the present invention and it will be understood that the kinds of the compounds and adjuvants, and the mixing ratio are not limited thereto.

EXAMPLE 3

25 parts by weight of the compound (3), 5 parts by weight of Sorpol 2170 (registered trademark of Toho Chemical Co., Ltd.) and 70 parts by weight of talcum are crushed and then mixed well to obtain a wettable powder.

EXAMPLE 4

30 parts by weight of the compound (1), 20 parts by weight of Sorpol 2492 (registered trademark of Toho Chemical Co., Ltd.) and 50 parts by weight of cyclohexanone are mixed well to obtain an emulsifiable concentrate.

EXAMPLE 5

One part by weight of the compound (2), 38 parts by weight of bentonite, 59 parts by weight of clay and 2 parts by weight of Toyolignin NP (registered trademark of Toyo Boseki Co., Ltd.) are crushed and mixed thoroughly. Then, the resulting mixture is added with water and then kneaded well. The kneaded mixture is granulated and then dried to obtain granules.

EXAMPLE 6

1.5 parts by weight of the compound (2) and 98.5 parts by weight of clay are crushed and mixed well to obtain a dust.

What is claimed is:

1. A phenoxyacetaldehyde ethyleneacetal derivative having the formula,

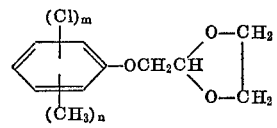

wherein $m$ and $n$ are zero or an integer from 1 to 5 and the sum of $m$ and $n$ is 1 to 5.

2. An acetal derivative having the formula,

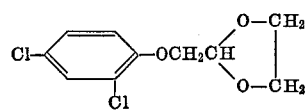

3. An acetal derivative having the formula,
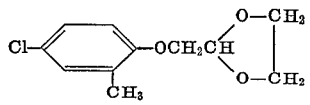
4. An acetal derivative having the formula,
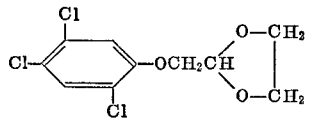
References Cited
UNITED STATES PATENTS
| | | | |
|---|---|---|---|
| 2,636,884 | 4/1953 | Tenenbaum, et al. | 260—340.9 |
| 2,680,733 | 6/1954 | Martin | 260—340.9 |
| 2,946,806 | 7/1960 | Nentwig et al. | 260—340.9 |
ALEX MAZEL, Primary Examiner
J. H. TURNIPSEED, Assistant Examiner
U.S. Cl. X.R.
71—88